United States Patent [19]
Ito et al.

[11] 3,987,486
[45] Oct. 19, 1976

[54] MAGNETIC TAPE CASSETTE PLAYER WITH HEAD POSITIONING AND EJECTION STRUCTURE

[75] Inventors: Yukio Ito; Satoshi Takagi; Hirotoshi Nara, all of Toda, Japan

[73] Assignee: Clarion Co., Ltd., Tokyo, Japan

[22] Filed: Apr. 11, 1975

[21] Appl. No.: 567,156

[30] Foreign Application Priority Data
Apr. 16, 1974 Japan............................ 49-42495
May 11, 1974 Japan........................ 49-52695[U]
Mar. 22, 1975 Japan........................ 50-37198[U]

[52] U.S. Cl.................................. 360/96; 360/105
[51] Int. Cl.².................. G11B 15/24; G11B 5/54; G11B 21/22
[58] Field of Search............................ 360/96, 105

[56] References Cited
UNITED STATES PATENTS

| | | | |
|---|---|---|---|
| 3,524,651 | 8/1970 | Ketzer | 360/105 |
| 3,589,733 | 6/1971 | Piotrowski | 360/105 |
| 3,758,119 | 9/1973 | Harlan | 360/96 |
| 3,896,493 | 7/1975 | Ando | 360/96 |

*Primary Examiner*—Robert S. Tupper
*Attorney, Agent, or Firm*—Frank J. Jordan

[57] ABSTRACT

A magnetic tape reproducing apparatus is provided for reproducing magnetically recorded tape in a cartridge. The apparatus is provided with a casing dimensioned to receive the cartridge with its transverse or shorter end directed to and through the inlet portion of the casing, so that the apparatus is built compact particularly widthwise. The various operating components of the apparatus are contrived accordingly to this end.

9 Claims, 23 Drawing Figures

MAGNETIC TAPE CASSETTE PLAYER WITH HEAD POSITIONING AND EJECTION STRUCTURE

BACKGROUND OF THE INVENTION

This invention relates to an apparatus for reproducing magnetically recorded tapes encased in cartridges, and has particular reference to a reproducing apparatus which is compactly built to suit the installation on automobiles and the like.

Heretofore, magnetic tape reproducing devices employing two-reel type cartridges have been designed to mount the cartridge with its longitudinal end directed to the front of the device. Such prior-art devices are therefore disadvantageous in that they will take up relatively large space lengthwise of the instrument panel of the automobile which is per se imposed with space limitations. Many advanced reproducing devices have been proposed in which the control knobs and pushbuttons are located above or under the cartridge inlet port so as to manage the installation of the device within the limited space of the panel. However, such attempts are not entirely satisfactory because the height of the panel is so much increased, and the ultimate objective of making the reproducing device as compact as compatible with the entire space requirements of the automobile is not achieved.

SUMMARY OF THE INVENTION

Whereas, it is the primary object of this invention to provide an improved magnetic tape reproducing apparatus which is built extremely compact as a whole by incorporating a new design concept of mounting a two-reel type tape cartridge with its transverse end (width) directed to the front of the mounting panel.

Another object of the invention is to provide improved operating components and mechanisms of the reproducing apparatus which are contrived to accomplish the above new design concept.

A further, more specific object of the invention is the provision of an electro-magnetic plunger whose function is utilized to perform automatic ejection of the tape cartridge as well as automatic reset of the apparatus for reception of the cartridge.

A still further specific object of the invention is the provision of an engaging arm on a slidable frame member operatively associated with a changing plate, which arm holds the latter plate in a predetermined position so as to ensure a travel of the tape always initially in the forward direction.

Still another object of the invention is the provision of means of locking the fast forward and reverse mechanism so that the tape can be taken up from one reel onto another expeditiously with use of a rotatable handle.

Yet another object of the invention is the provision of an improved means of bringing the cartridge into pressure engagement with the magnetic head and pinch rollers whereby this engagement is effected with a maximum of required pressure and increased stability.

Still another further object of the invention is the provision of a stopper means of temporarily holding the cartridge in an elevated position until the hand of the operator is released from the cartridge when fully inserted.

These and other objects and features of the invention will appear more clear from the following detailed description of certain preferred embodiments of the invention when taken in conjunction with the accompanying drawings. Like reference characters and numerals denote like parts throughout the several views.

DESCRIPTION OF THE PREFERRED EMBODIMENTS

Figure 1:
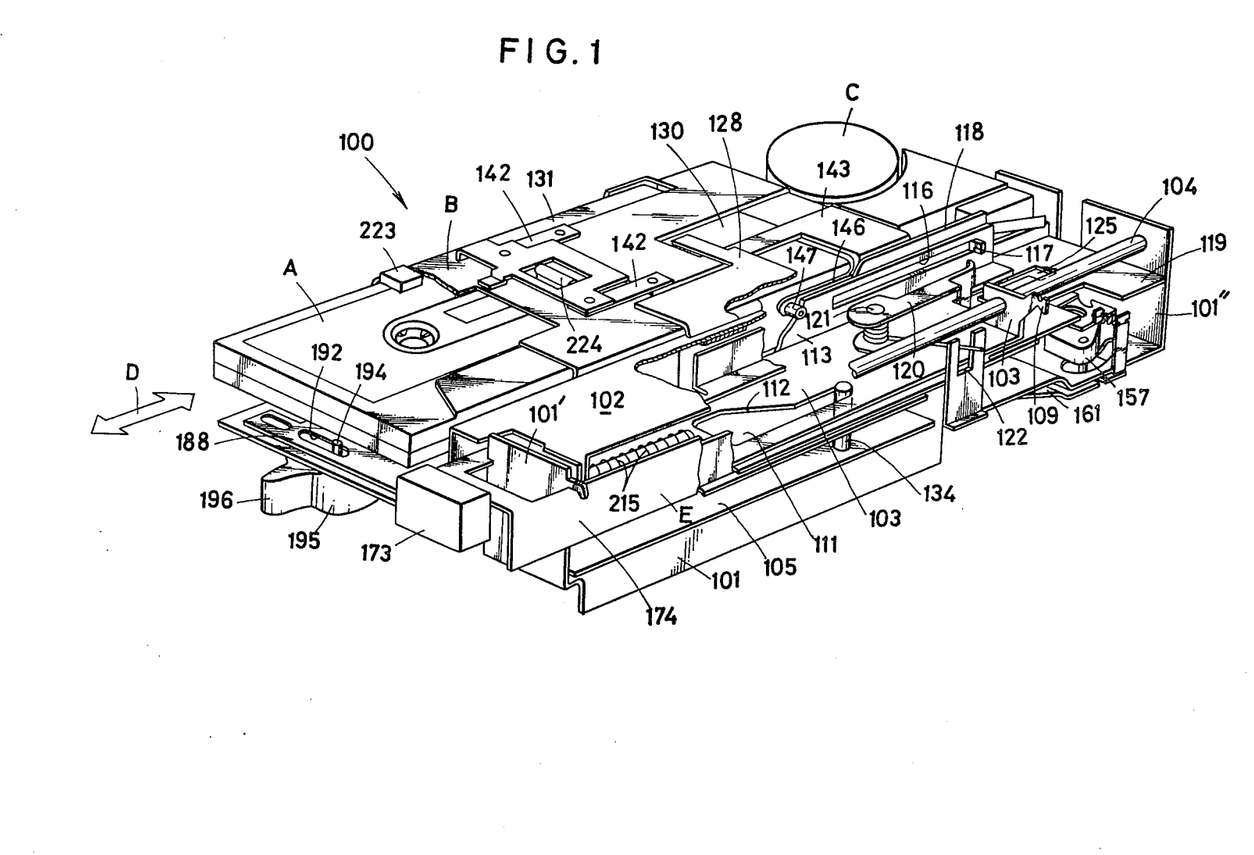
FIG. 1 is a perspective view of a magnetic tape reproducing apparatus embodying the invention.

Referring now to the drawings and FIG. 1 in particular, there is shown a magnetic tape reproducing apparatus 100 provided in accordance with the invention which generally comprises a chassis 101 having mounted thereon a cartridge mounting section B which can be raised and lowered and a reel drive motor C disposed behind the section B. A tape cartridge A is arranged to be inserted into and expelled from the apparatus 100 in the direction of the arrow D. The front end of the apparatus 100 is located where the cartridge A is exposed to view. Designated at E is an ejecting mechanism disposed on the right-hand side of the mounting section B.

Figures 2, 3:
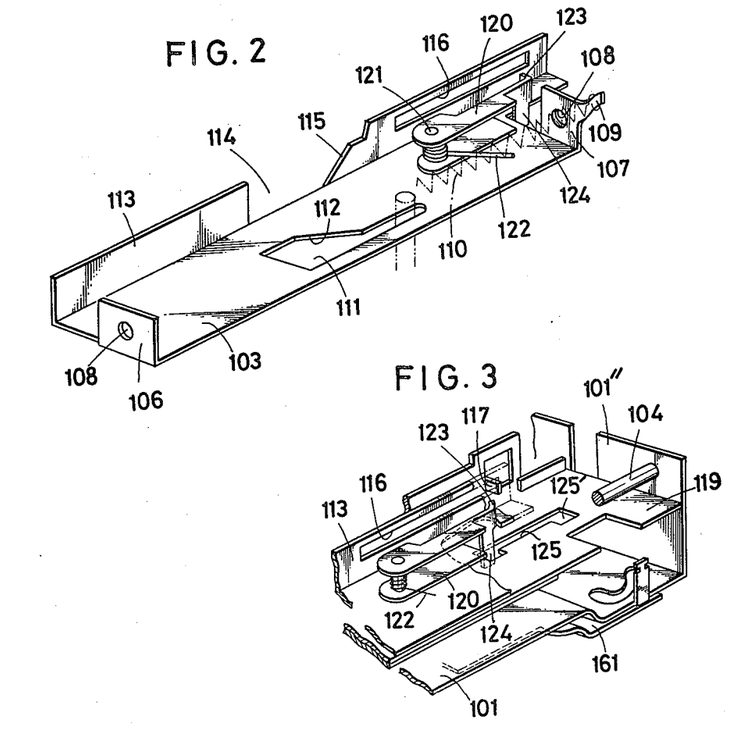
FIG. 2 is a perspective view of a lower slidable frame member included in the apparatus of FIG. 1.
FIG. 3 is a perspective view of an engaging arm forming part of the lower slidable frame member.
Figure 4:
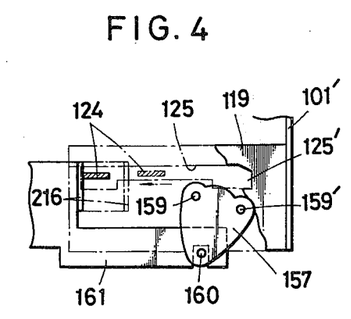
FIG. 4 is a plan view utilized to explain the relationship between the upper plate of the chassis and the changing plate.
Figure 5:
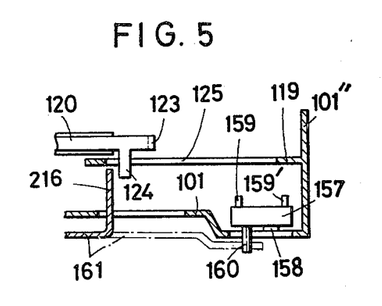
FIG. 5 is a longitudinal cross section of the same.

The ejecting mechanism E comprises an upper slidable frame member 102 and a lower slidable frame member 103 which are adapted to serve the function of mounting and dismounting the cartridge A in a manner hereinafter described and which are mounted on a guide bar 104 fixedly connected to upwardly directed ends 101' and 101'' of the chassis 101. The lower slidable frame member 103 is adapted to actuate the head plate 105 which is slidable in close contact with the upper surface of the chassis 101. As better shown in FIG. 2, the lower frame member 103 is provided with integral end flanges 106, 107 each having an opening 108 through which the guide bar 104 is inserted. The end flange 107 is provided with a projection 109 to which an eject spring 110 is connected for normally urging the lower frame member 103 forwardly. The member 103 is provided with substantially triangular cutout slot 111 having a tapered edge 112. The member 103 is also provided integrally with an upright side wall 113 having centrally thereof a cutaway recess 114 with sloped edge 115. The side wall 113 is provided rearwardly of the recess 114 with an elongated slot 116 adapted to receive a projecting strip 117 (FIG. 1) integral with the chassis 101, which strip extends laterally from a vertical plate member 118 formed integrally with an upper deck 119 of the chassis 101. As shown in FIG. 2, an engaging arm 120 is pivotally mounted at one end on a pin 121 connected to the lower frame member 103 adjacent to the elongated slot 116. To the pin 121 is connected a spring 122 adapted to normally urge the arm 120 counter-clockwise. On the opposite end of the arm 120 are formed a lateral projection 123 and a downwardly extending tongue 124 engageable in a locking slot 125 formed in the upper deck 119 of the chassis 101 as shown in FIG. 3.

Figure 6:
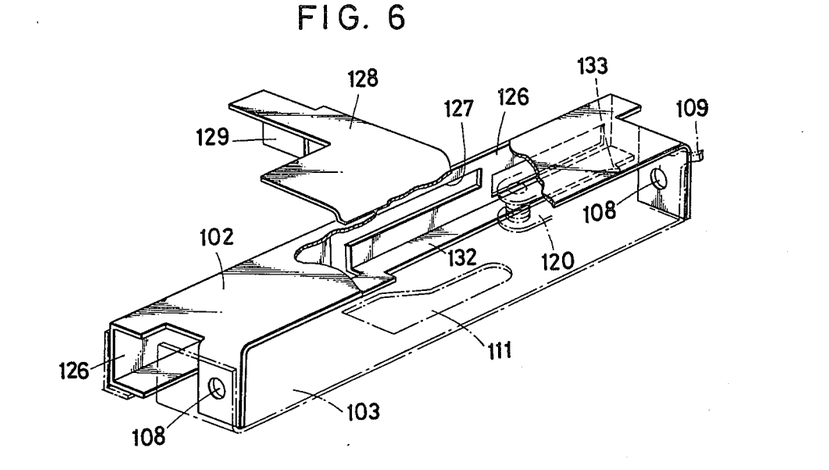
FIG. 6 is a perspective view of an upper slidable frame member included in the apparatus of FIG. 1.

The upper slidable frame member 102 is mounted on the guide bar 104 is face-to-face relation to the lower slidable frame member 103. The upper frame member 102 is provided with a flanged side wall 126 having an elongated engaging slot 127. As shown in FIG. 6, a cartridge receiving and releasing arm 128 extends laterally from the upper frame member 102 and has a downwardly projecting abutment 129 disposed in the path of the cartridge A at a predetermined location defined by a recess 130 formed in a cartridge casing 131. A lateral ledge 132 extends from the side wall 126 beneath the slot 127 and is provided at one end with a prong 133 registering in position with the lateral projection 123 of the arm 120 in the lower frame member 103. The arm 120 is biased by the spring 122 to rotate the projection 123 counter-clockwise as viewed in the drawing into engagement with the prong 133.

Figure 7:
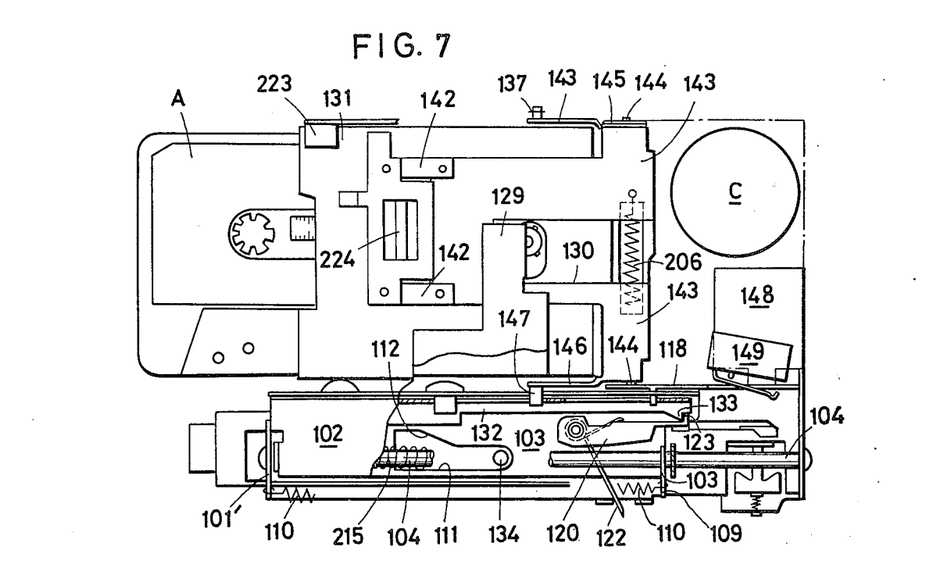
FIG. 7 is a plan view, partly broken away, of the apparatus.
Figure 8:
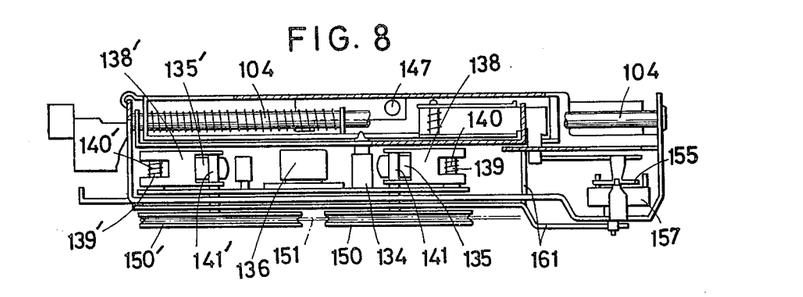
FIG. 8 is a right-hand side elevation of the same.

As seen from FIGS. 7 and 8, the head plate 105 has a guide pin 134 of which tip end is engaged in the guide slot 111 of the lower frame member 103. On the head plate 105 are arranged pinch rollers 135, 135', magnetic head 136 and sensing contact (not shown). Pinch roller supports 138, 138' are rotatable around pins 139, 139' and urged into position by springs 140, 140' connected to the pins 139, 139', respectively. Actuating pins 141, 141' are connected to the pinch roller supports 138, 138', which pins extend all way down to the back of the chassis 101.

Figure 9:
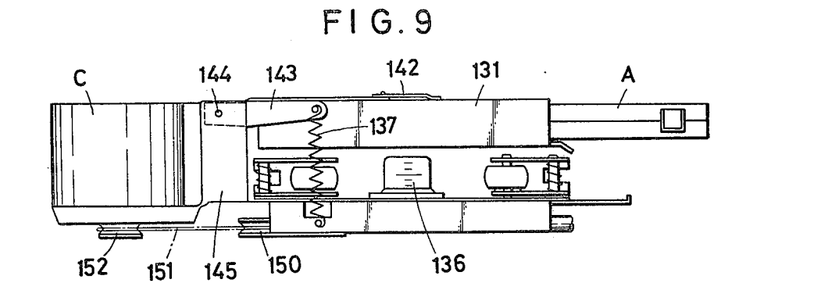
FIG. 9 is a left-hand side elevation of the same.

The cartridge casing 131 is cross-sectionally channel-shaped to provide a passage for the cartridge A and has its bottom open. The upper portion of the casing 131 is fixedly connected to an elevating frame 143 via resilient foils 142 as seen in FIG. 9. The frame 143 is pivotally mounted on a pin 144 to rotate between bearing 145 integral with the chassis 101 and the vertical plate member 118 on the chassis 101. The casing 131 is provided on one side with a spring 137 adapted to lower the cartridge A and on the other side with integral arm 146 having an engaging pin 147 movable with sliding movement of the slidable frame members when the cartridge A is inserted or removed. Behind the casing 131 are provided a tape drive motor C, an electro-magnetic plunger 148 for controlling the tape drive and a limit switch 149 above the plunger. A pair of flywheels 150, 150' are connected via belt 151 to the drive shaft 152 of the motor C (FIG. 9). The rotating shafts of the flywheels 150, 150' are extended above the head plate 105 so as to serve as the capstan shafts 153, 153' which are engageable with the pinch rollers 135, 135', respectively, to move the magnetic tape as shown in FIG. 10.

The plunger 148 has the following categories of control function:
a. Automatic reverse of tape,
b. Cartridge ejection, and
c. Automatic release of the reproducing apparatus.

Figure 10:
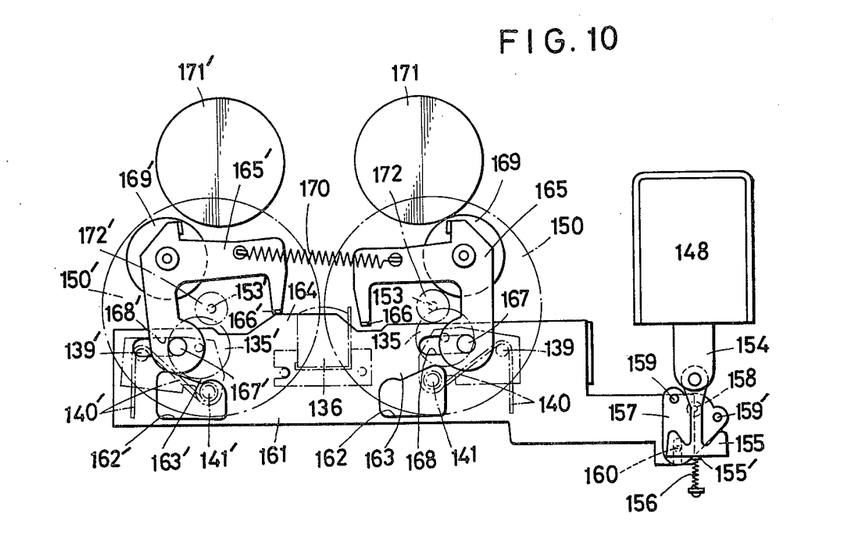
FIG. 10 is a schematic plan view of a tape reverse mechanism.

As best shown in FIG. 10, the automatic tape reverse mechanism includes the plunger 148 which as a slidable member 154 and an anchor-shaped hook 155 pivotted at one end thereto. To the other end of the hook 155 is connected a spring 156 imparting a bias in a direction opposite to the attraction of the plunger 148. Underneath the hook 155 is provided a triangular swing plate 157 which is rotatable around a pivotal pin 158 extending from the chassis 101. On the opposite ends of the base of the triangular swing plate 157 are provided engaging pins 159, 159'. At the apex of the plate 159 is also provided a similar pin 160 which extends downwardly into engagement with a changing plate 161 on the lowermost surface of the chassis 101. The changing plate 161, as seen from FIG. 10, is relatively long and is slidable along the lower face of the chassis 101. It is provided at its widened portion with a pair of oppositely disposed apertures 162, 162' substantially square in shape. The apertures 162, 162' have oppositely directed bays 163, 163'. The actuating pins 141, 141' are urged by their respective springs 140, 140' to engage with the peripheries of the apertures 162, 162', respectively. Leftward or rightward movement of the changing plate 161 as viewed in the drawing causes the actuating pins 141, 141' to rotate about the pins 139, 139' in engagement with the peripheries of the apertures 162, 162'.

The changing plate 161 is provided with a bulged portion 164 centrally between the two apertures 162, 162', which bulged portion is disposed for abutting engagement with either of the tip ends 166, 166' of crank arms 165, 165'. These arms are symmetrically disposed for rotation on fixed pins 167, 167' relative to the chassis 101. These fixed pins extend through guide slots 168, 168' in the changing plate 161 so as to serve as a guide for this plate. A pair of idler rollers 169, 169' are rotatably connected to the crank arms 165, 165', respectively as shown in FIG. 10. A spring 170 is connected between the two arms 165, 165' so as to bias either of the tip ends 166, 166' into engagement with the bulged portion 164 of the changing plate 161. The idler rollers 169, 169' impart rotation of the capstan shafts 153, 153' to the reel bases 171, 171'. This is effected by bringing the idler rollers 169, 169' into peripheral contact with the sleeves 172, 172' mounted coaxially with the flywheels and capstan shafts and formed integrally with the latter. More specifically, as the changing plate 161 is moved horizontally in either direction, the crank arm 165 or 165' is disengaged from the bulged portion 164 of the changing plate 161 and is further pulled by the spring 170 until the idler roller 169 or 169' is brought into pressure contact with the reel base 171 or 171' and the sleeve 172 or 172' thereby transmitting rotation of the flywheels to the reel base. While one of the two idler rollers is released, the other roller is thus brought into pressure contact with the other sleeve on the corresponding capstan shaft and the other reel base.

The cartridge release mechanism according to the invention includes an ejecting pushbutton 173 located adjacent the cartridge inlet port as shown in FIG. 1 and having connected thereto an operating rod 174 which extends longitudinally of the apparatus. The operating rod 174 has an obliquely extending slot 175 which is formed at an angle of about 45° with respect to the longitudinal axis of the rod and which is located at an end 176 opposite to the pushbutton 173. The slot 175 is adapted to receive an engaging pin 177 extending from the upper deck 119 of the chassis 101, the arrangement being that the operating rod 174 moves obliquely in a direction defined by the oblique slot 175. Disposed in overlying relation to the oblique slot 175 is a control rod 178 which has formed therein a square aperture 179 having an area far greater than the diameter of the engaging pin 177. The control rod 178 is interposed between the operating rod 174 and the upper deck 119 of the chassis. It has an upwardly directed side flange 178' disposed in superposed relation to a similar flange 174' provided on the operating rod 174. The operating rod and control rod are provided with return springs 180 and 181, respectively. The control rod 178 has one end located adjacent to the back of the locking slot 125 in the upper deck 119 of the chassis, the said one end being reduced to form a sensing strip 182. There is provided a recess 125' in the rearward portion of the locking slot 125 for engagement with the tongue 124 of the arm 120 on the lower slidable frame member 103. The sensing strip 182 is adapted to release the tongue 124 from the recess 125'. It will be appreciated that the tongue 124 is locked in the recess 125' which is relatively shallow and can be easily released therefrom by moving the sensing strip 182 obliquely leftward as viewed in the drawing.

Figure 11:
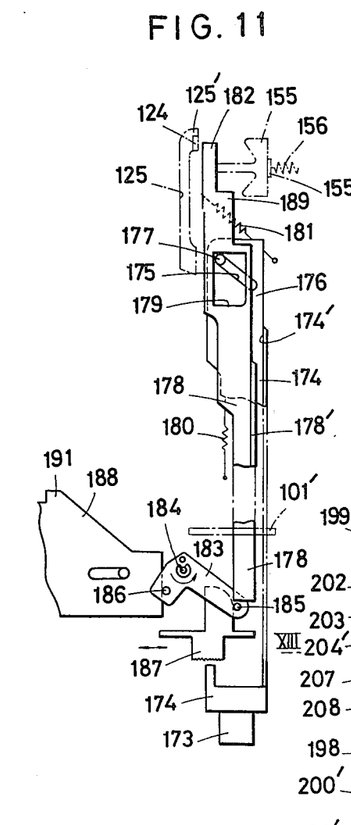
FIG. 11 is a plan view of a cartridge release mechanism.

The mechanism for automatically releasing the tape reproducing apparatus will now be described. This mechanism is designed so that the tape cartridge A may be released or dismounted from its operative position on the apparatus upon completion of one complete cycle of playback of the tape by effecting automatic reverse of the reel once. Cartridge release is effected by short-circuiting the sensing contact in engagement with a conductor foil attached to the magnetic tape, when the plunger 148 is actuated. More specifically, as illustrated in FIG. 11, the other end of the control rod 178 extends through and beyond the front end wall 101' of the chassis and is disposed for engagement with an L-shaped pivotal arm 183. This arm is pivotal about an axis 184 and has a first contact pin 185 at one end and a second contact pin 186, the first pin 185 being adapted to engage with the control rod 178. The first pin 185 is also disposed for abutting engagement with a horizontally slidable pushbutton 187 as shown in FIG. 11. The second pin 186 of the arm 183 is disposed for abutting engagement with one end of a moving plate 188. Moving the slidable pushbutton 187 rightward as viewed in the drawing causes the L-shaped arm 183 to rotate counter-clockwise thereby pushing the control rod 178 backward via the first pin 185. As the control rod 178 is thus retracted, the stepped portion 189 of this rod at the opposite end is brought into the position shown in FIG. 28, which represents an operative state of the automatic release mechanism.

Figure 12:
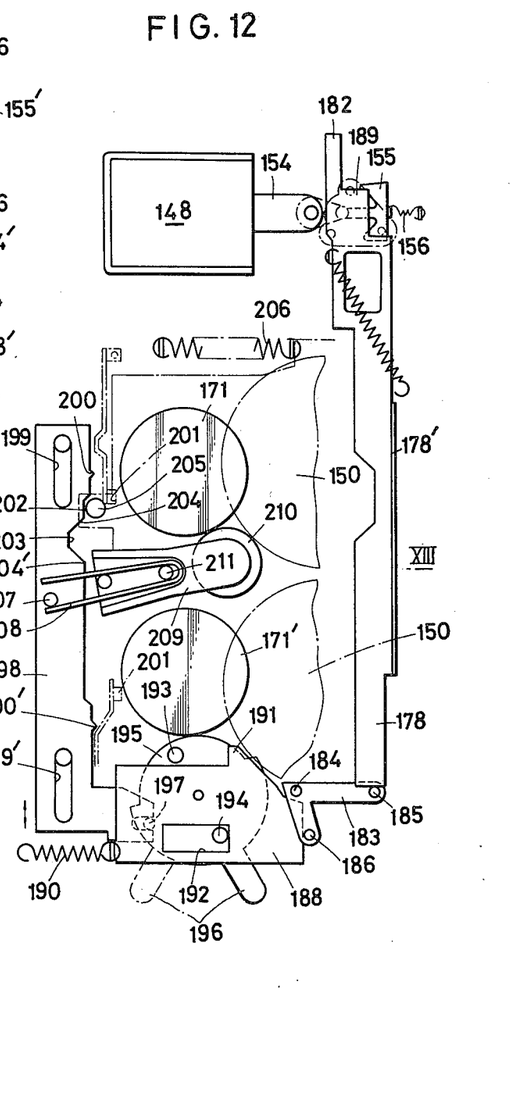
FIG. 12 is a schematic plan view of a fast forward and rewind mechanism.

The fast forward and rewind mechanism FF is linked to the moving plate 188 and will now be described. As seen in FIG. 12, the moving plate 188 has one end disposed in engagement with the arm 183 as previously stated and the other end connected to a return spring 190. A further inspection of FIG. 12 shows that the moving plate 188 is provided with a rearwardly extending projection 191 and with a substantially square elongate slot 192, which are disposed for engagement respectively with engaging pins 193, 194, extending upwardly from a disc-like operating lever 195. The operating lever 195 is provided with a handle 196 for rotating the lever clockwise or counter-clockwise. Extending backwardly from the lever 195 is a stopper pin 197 engageable with an L-shaped end of FF control plate 198. Rotating the handle 196 in either direction causes the lever 195 to shift the moving plate 188 either to the left or the right through the action of the pins 193, 194, so that the FF control plate 198 moves accordingly back or forth along guide slots 199, 199'. The control plate 198 has lateral projections 200, 200' on opposite ends thereof for actuating a brake shoe 201 and offset recesses 202, 203, of which recess 203 has oppositely disposed ridges 204, 204'. The recesses 202, 203 are adapted to receive an actuating pin 205 extending from the head plate 105. A return spring 206 is provided on the head plate 105 for normally urging the actuating pin 205 into the recess 202. The FF control plate 198 is further provided with an upwardly projecting hook 207 engageable with a hair-pin member 208 accommodated in a rotary plate 209 connected to an idler roller 210. The idler roller 210 is disposed for rotation relative to the rotary plate 209. The rotary plate 209 is pivotable about an axis 211 so that the idler roller 210 can be brought into pressure engagement with the flywheels 150, 150' and the reel bases 171, 171'. Rotating the handle 196 in one direction brings the idler roller 210 into contact with the flywheel 150 and the reel base 171, and alternatively with rotation of the handle 196 in the other direction the idler roller 210 is brought into contact with the other flywheel 150' and the other reel base 171'. Simultaneously with this operation, the FF control plate 198 moves back and forth with the lateral projections 200, 200' forcing the brake shoe 201 into engagement with the reel base.

The operation of the reproducing apparatus above constructed will now be described.

1. MOUNTING THE CARTRIDGE.

Figure 13:
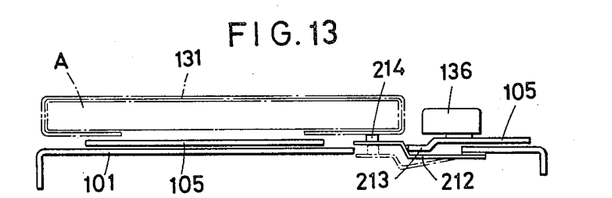
FIGS. 13 and 14 are a cross sectional view of part of the same taken along the line XIII—XIII of FIG. 12.
Figure 14:
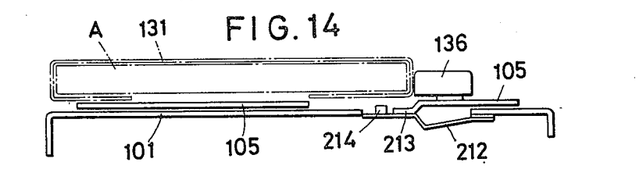
Figure 15:
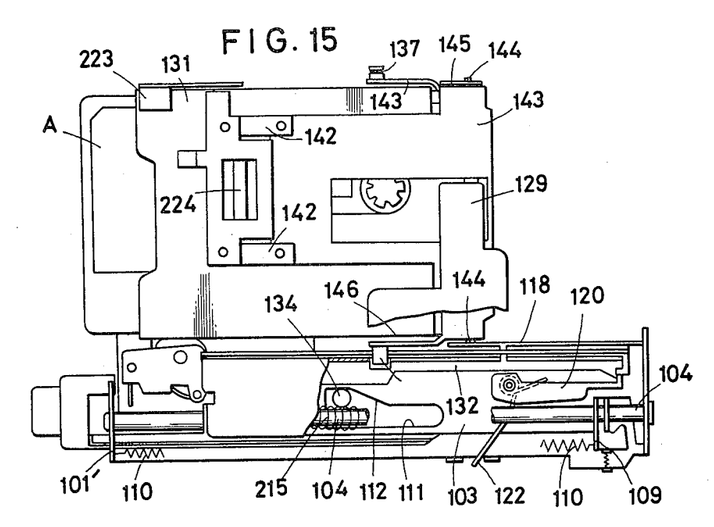
FIG. 15 is a view similar to FIG. 7 but showing the cartridge fully mounted in place.
Figure 16:
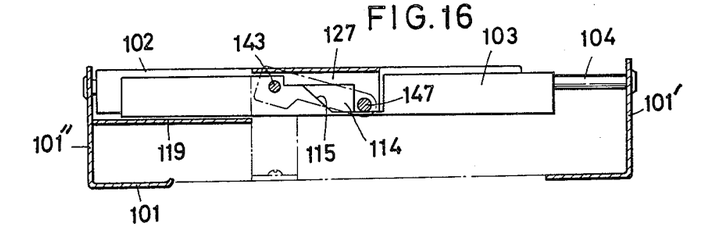
FIG. 16 is a schematic longitudinal cross sectional view of the upper and lower slidable frame members, illustrating a mechanism for lifting the cartridge casing.
Figure 17:
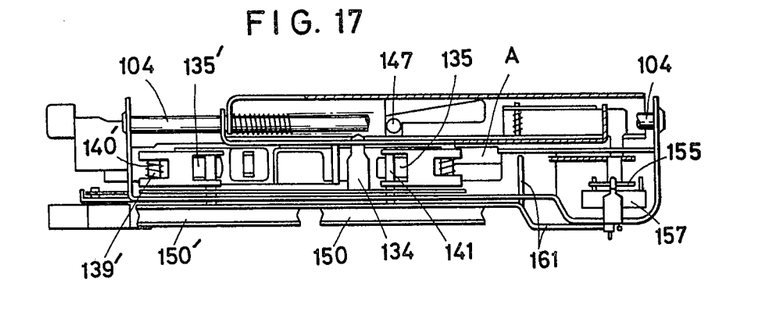
FIG. 17 is a right-hand side elevation of FIG. 15 with parts taken away.
Figure 18:
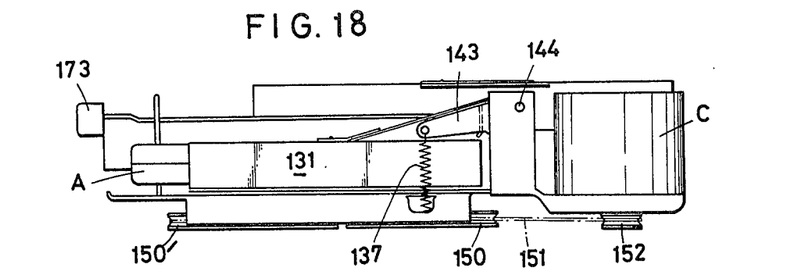
FIG. 18 is a left-hand side elevation of FIG. 15.

The cartridge A is inserted into the casing 131 with its longitudinal end first as shown in FIG. 1. The forward end of the cartridge A abuts against the abutment 129 of the receiving and releasing arm 128 which is formed integrally with or fixedly connected to the upper slidable frame member 102. Since the prong 133 of the frame member 102 has been engaged with the lateral projection 123 of the engaging arm 120, the cartridge A when further advanced causes the upper frame member 102 to move together with the lower frame member 103 along the guide bar 104 rearwardly or inwardly against the resilient force of the spring 110. Prior to the insertion of the cartridge A, the head plate 105 has been displaced to the right as shown in FIG. 13 by the action of a leaf spring 212 tending to suppress the tongue 213 of the head plate 105 upwardly. With advancement of the cartridge A together with the upper and lower frame members, the elevating frame 143 supporting the cartridge casing 131 has its engaging pin 147 dropped into the slot 127 (FIG. 6) by the action of the spring 137 (FIG. 9), whereby the casing 131 and the cartridge A therein are plunged down against a projection 214 on the leaf spring 212 to hold the latter down into the position shown in FIG. 14. This causes the tongue 213 to disengage from the leaf spring 212, so that the head plate 105 is urged by the spring 206 (FIG. 12) toward the cartridge A until the magnetic head 136 is brought into contact with the tape in the cartridge A. As shown in FIGS. 2 to 6, the projection 124 of the arm 120 on the lower frame member 103 moves in and along the locking slot 125 and engages in the recess 125' under the influence of the spring 122. Thus, the frame member 103 is held in the locked position wherein it is biased toward the front as viewed in FIG. 1 by the action of the spring 110. The guide pin 134 on the head plate 105 moves along the periphery of the guide slot 111 but is prevented from entering the tapered edge portion 112 of the slot 111 while the cartridge A is half way in because the head plate 105 is locked in position under the influence of the leaf spring 212 on the chassis 101. Hence, all components on the head plate 105 including the magnetic head 136, pinch rollers 135, 135' and the like are still held apart from the cartridge A. When the cartridge A has been completely inserted into position on the apparatus as shown in FIG. 14, the head plate 105 is actuated to bring the head 136 and pinch rollers 135, 135' into contact with the tape as required. Simultaneously with the mounting of the cartridge A, the motor C is started by the limit switch 149 (FIG. 7) along which the side wall 126 of the upper frame member 102 slides to turn on power to place the reproducing apparatus 100 in operative condition.

2. REVERSING THE MAGNETIC TAPE.

Figure 19:
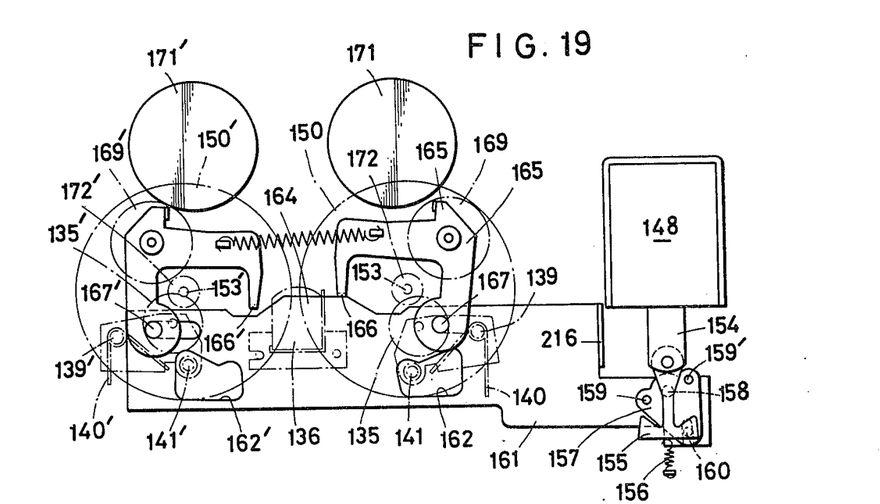
FIG. 19 is a schematic plan view similar to FIG. 10 but showing the mechanism in reversed position.

As the cartridge A is inserted and the motor C started, the pinch rollers 135, 135' are brought into pressure engagement with the capstan shafts 153, 153' respectively, thereby effecting the travel of the tape in the direction of rotation of the capstan to reproduce the sound recorded on the tape. When the tape has come to a terminal end, the plunger 148 is energized in the usual manner by short-circuiting the sensing contact in contact with the conductor foil on the tape or by detecting the stoppage of the tape reels. With the plunger 148 thus energized, the slidable member 154 is retracted with its anchor-shaped hook 155 engaged with the pin 159' so that the swing plate 157 rotates about the axis 158 counter-clockwise as viewed in the drawing in a manner shown in FIG. 10. The changing plate 161 linked with the swing plate 157 will then move toward the right as viewed in the drawing, whereupon the actuating pins 141, 141' are moved guidedly along the peripheries of the apertures 162, 162' respectively so as to release one pinch roller 135 and take the other pinch roller 135' into engagement with the capstan shaft 153' as illustrated in FIG. 19. Since the flywheels 150, 150' are mounted on the capstan shafts 153, 153', respectively but are belted to rotate in a direction opposite to the latter, reverse travel of the tape is effect. In other words, the tip end 166' of crank arm 165' to which the idler roller 169' is attached is disengaged from the bulged portion 164 of the changing plate 161, so that the idler roller 169' is brought into contact with the sleeve 172' and the reel base 171' thereby effecting rotation of the tape reel to take up the tape forwarded by the capstan shaft and pinch roller. The other idler roller 169, simultaneously with the switching of the idler roller 169' into operation, will be disengaged from the reel base 171. This is effected by engaging the tip end 166 of crank arm 165 with the bulged portion 164 of the changing plate 161, with the spring 170 pulling the other idler roller 169'. Thus, the magnetic tape begins to travel from the reel base 171 in free rotation onto the other reel base 171' in driven condition and is taken up on the latter reel in the usual manner. Upon completion of this take-up operation, the plunger 148 is again energized in the manner already described to actuate the hook 155, when the swing plate 157 is in the position shown in FIG. 19. The hook 155 therefore engages with the pin 159 thereby effecting rotation of the swing plate 157 clockwise about the axis 158 so as to move the changing plate 161 toward the left as viewed in the drawing, whereupon the pinch roller 135' is released. Consequently, the other pinch roller 135 is taken into operation to drive the reel base 171. In this manner, the magnetic tape is reversed until it comes to the other terminal end, when the cycle of operation is repeated.

3. RELEASING THE CARTRIDGE.

In the event that reproduction of the magnetic tape should be discontinued or the tape replaced, the cartridge A may be released from its mounting position by depressing the pushbutton 173 shown for example in FIG. 11. Depressing the pushbutton 173 causes the operating rod 174 to move obliquely inwardly along the oblique slot 175 with respect to the direction in which the pushbutton is depressed, so that the side flange 174' of the rod 174 abuts against the side flange 178' of the control rod 178 and shifts the latter toward the left as viewed in the drawing. The sensing strip 182 on the control rod 178 is likewise moved to the left so as to disengage the tongue 124 of the arm 120 from the locking slot 125, whereupon the spring 110 acts to return the upper and lower frame members 102, 103 swiftly along the guide bar 104 to their initial position in which the cartridge A is absent.

Since the eject spring 110 is designed with relatively powerful resilient force, the guide pin 134 extending from the head plate 105 is urged to move with the return movement of the frame members outwardly along the tapered edge 112 of the cutout slot 111 until the head plate 105 is brought back to the initial position shown in FIG. 7, against the resilient force of the spring 206, for receiving the tape cartridge A. The magnetic head 136, pinch rollers 135, 135' and the like are all thus placed in inoperative condition.

Figure 20:
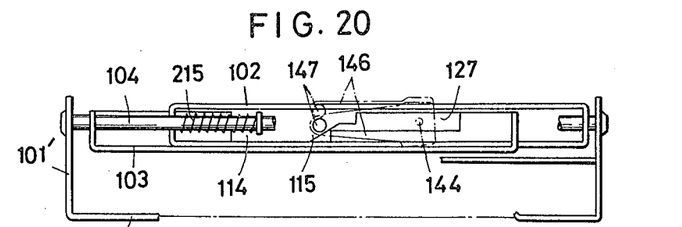
FIG. 20 is a cross sectional view of part of the mechanism for lifting the cartridge casing.
Figure 21:
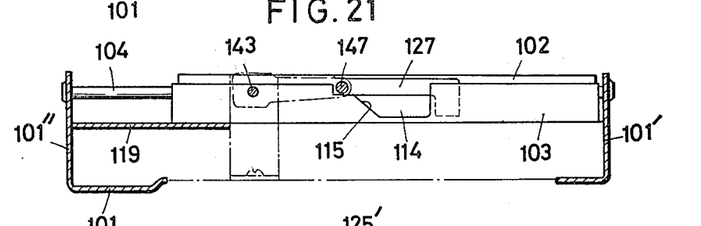
FIG. 21 is a schematic cross sectional view of the casing shown raised.

Substantially simultaneous with the releasing of the magnetic head from pressure engagement with the cartridge, the sloped edge 115 of the recess 114 in the side wall 113 of the lower frame member 103 lifts the pin 147 of the arm 146 as shown in FIG. 20 so that the elevating frame 143 rotates about the pin 144 against the action of the spring 137 thereby elevating the cartridge casing 131 from its submerged position. The pin 147 of the arm 146 is thus lifted by the sloped edge 115 out of engagement with the slot 127, and the upper frame member 102 is caused to move toward the right as viewed in FIG. 21 (or to the left as viewed in FIG. 20) against the resilient force of a spring 215 (FIG. 20) provided on the guide bar 104, which spring 215 has one end connected to the guide bar 104 and the other end to the front flanged end of the upper frame member 102. With moving upper frame member 102, the cartridge receiving and releasing arm 128 thereon moves so that the tape cartridge A which has been mounted in position is now expelled by the abutment 129 from the path of insertion.

4. INITIATING THE UNIDIRECTIONAL TRAVEL OF THE TAPE.

In magnetic tape reproducing devices where the reversal of tape travel is automatically carried out, it is advantageous to arrange so that the tape starts always in one specific direction. For this purpose, the present invention contemplates the provision of a limiting strip 216 (FIGS. 4, 5 and 8) integral with and extending upwardly from the changing plate 161. The position of this strip 216 is set to register with the position of the downwardly extending tongue 124 of the arm 120 when the cartridge is not in. Once the cartridge is released even when the tape is being reversed, the limiting strip 216 is brought into abutting engagement with the tongue 124 of the arm 120 and pushed back so that the changing plate 161 assumes the position shown in FIG. 10. Therefore, when the cartridge is put back in again for playback of the tape on the apparatus, the pinch roller 135 is always brought into pressure contact with the capstan shaft 153 so that the tape begins to travel in one predetermined direction. Thereafter, the operating procedure is repeated.

5. AUTOMATICALLY EJECTING THE CARTRIDGE.

Figure 22:
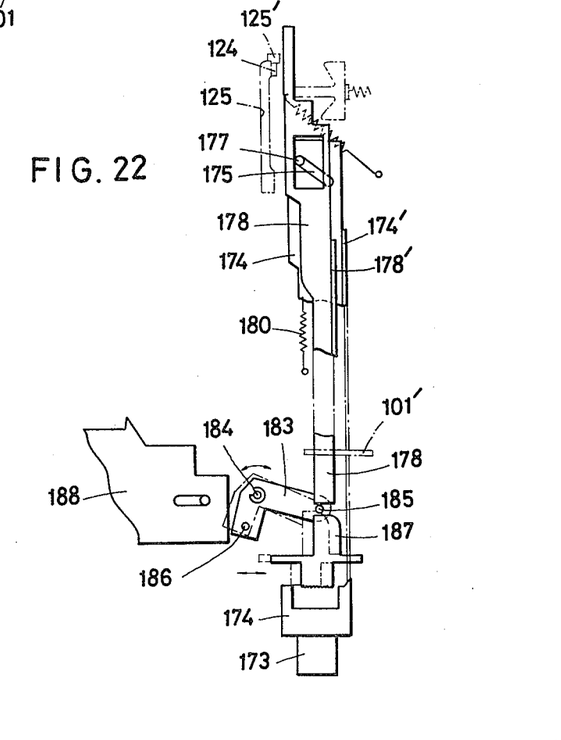
FIG. 22 is view similar to FIG. 11 but showing the cartridge release mechanism in varied operative position.
Figure 23:
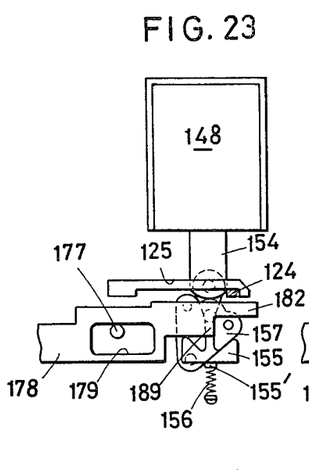
FIGS. 23, 24 and 25, inclusive, are a schematic plan view utilized to explain the operation of an automatic ejecting mechanism.
Figure 24:
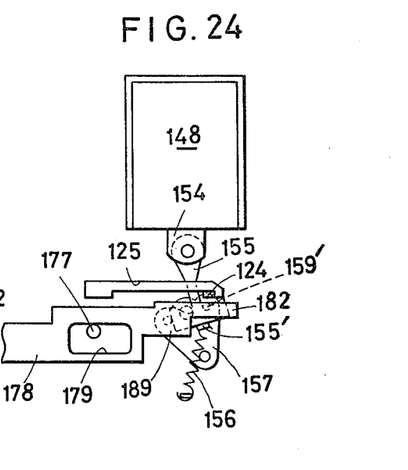
Figure 25:
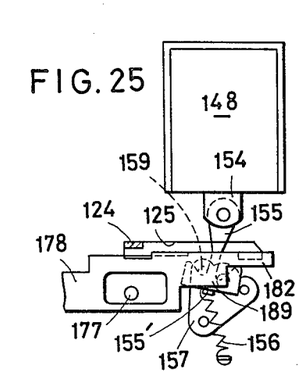
Figure 26:
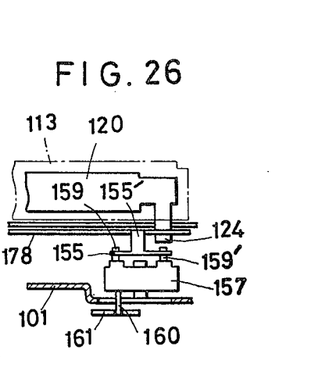
FIG. 26 is an elevational view of part of the ejecting mechanism.

The cartridge A is forwarded in one direction for reproduction of the tape and reversed in the other direction to complete one cycle of reproducing operation. The cartridge A is then automatically expelled from its operative position on the apparatus. The automatic ejecting mechanism according to the invention is put into operation sliding the pushbutton 187 rightward from the position of FIG. 11 to that of FIG. 22, whereupon the arm 183 rotates about the pin 184 counter-clockwise thereby causing the first pin 185 to lift the control rod 178 with the stepped portion 189 thereof lying in the position given in FIGS. 23-26. The control rod 178 is so designed that its stepped portion 189 is brought into abutting engagement with the projection 155' of the hook 155 only when the latter engages the pin 159 upon energization of the plunger 148 as shown in FIG. 25. The swing plate 157 is linked to the changing plate 161 as previously stated which has integral limiting strip 216 (FIGS. 4 and 5) disposed in abutting relation to the arm 120. The swing plate 157 is disposed in the position shown in FIG. 23 when the magnetic tape starts in one predetermined direction. As the tape is reversed for the first time, the hook 155 attracted by the plunger 148 engages always with the pin 159' of the pair of pins. At which time, the hook 155 has its projection 155' displaced from the stepped portion 189 of the control rod 178 and acts upon and rotates the swing plate 157 as shown in FIG. 24. As the tape is thus reversed to continue its reproduction until it comes to a terminal end, the plunger 148 is again energized in the manner already advanced. At this time, the swing plate 157 is disposed in the position of FIG. 24, the hook 155 is retracted to engage the pin 159 on the swing plate 157 and the projection 155' of the hook 155 abuts against the stepped portion 189 of the control rod 178, whereupon the sensing strip 182 of the control rod 178 takes the tongue 124 out of engagement with the locking slot 125 as shown in FIG. 25. The upper frame member 102 to which the arm 120 is attached moves so as to eject the cartridge A in the manner already described.

6. FAST FORWARD AND REWIND OPERATION (FF FUNCTION).

Figures 27, 28:
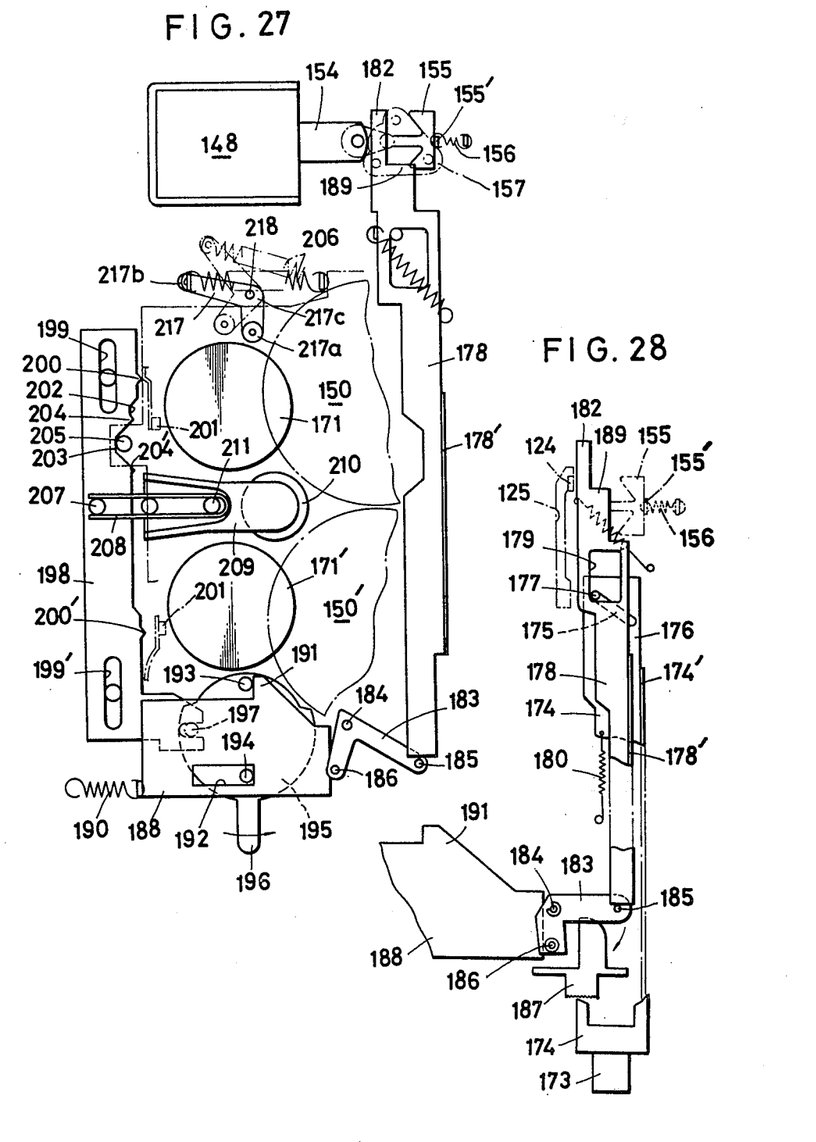
FIG. 27 is a schematic plan view similar to FIG. 12 but showing the fast forward and rewind mechanism in varied operative position.
FIG. 28 is a view similar to FIG. 11 but showing the control rod fully retracted.

This operation is intended to permit the tape to quickly move in either direction when it is desired to reproduce certain part of the tape in the cartridge A mounted in place on the apparatus. In normal playback mode of operation, the operating lever 195 has its handle 196 disposed in its neutral portion as shown in FIG. 27 wherein the idler roller 210 is disengaged from either of the reel bases and the flywheels, with the magnetic tape moving either from the reel base 171 to the reel base 171' or vice versa. Moving the handle 196 now to the right as viewed in the drawing causes the lever 195 to rotate counter-clockwise to move the pin 197 in the same direction as shown in FIG. 12 thereby moving the FF control plate 198 downward as viewed in the drawing. The upwardly projecting hook 207 of the FF control plate 198 is urged by the resilient bifurcated pin 208 to rotate the rotary plate 209 counter-clockwise about the axis 211, so that the idler roller 210 attached to the rotary plate 209 is brought into pressure engagement with both the flywheel 150 and the reel base 171. Whereas, the head plate 105 which has been engaged in the recess 203 of the FF control plate 198, has its actuating pin 205 (FIG. 27) moving into engagement with the recess 202 contiguous with the recess 203 and locked in this engagement by means of the stopping ridge 204. Thus, the head plate 105 has moved from the position of FIG. 27 to that of FIG. 12, which movement rightward as viewed in the drawing releases the pinch rollers from the capstan shafts thereby effecting high-speed rotation of the reel base 171 with the idler 210 to take up the tape. Rotating the handle 196 now in the opposite direction causes the FF control plate 198 to move likewise in the opposite direction whereby the idler roller 210 is brought into engagement with the reel base 171' and the flywheel 150'. The head plate 105 has its actuating pin 205 then locked in place by the stopping ridge 204'. The magnetic tape is thus taken up on the other reel base 171'. In the meantime, the handle 196 is maintained in its locked position by the engagement of the pin 205 with the ridge 204' until the fast forward or reverse operation is completed.

Since there are provided a pair of engaging pins 193, 194 extending symmetrically on a diametric line of the disc-like operating lever 195 and disposed for engagement with the rearwardly extending projection 191 and the elongate slot 192, respectively, the moving plate 188 always moves rightward as viewed in the drawing whichever direction the handle 196 is moved. The arm 183 engaged with the right end of the moving plate 188 is caused to move counter-clockwise about the pin 184 with the fast forward mode of movement of the moving plate 188, so that the control rod 178 is lifted further up as shown in FIG. 28 into its uppermost position. The stepped portion 189 of the control rod 178 is always disposed in abutting relation to the projection 155' of the hook 155 during retraction of the latter. This means that upon completion of the tape take-up with either the fast forward or reverse operation, the plunger 148 energized thereby causes the tongue 124 to disengage from the recess 125' so that the tape cartridge A is automatically ejected simultaneously as the take-up operation is completed, and the handle 196 is returned to its neutral position under the influence of the spring 190.

In accordance with the present invention, there is provided an improved means of effecting pressure engagement of the cartridge with the magnetic head and pinch rollers, which means includes a pivotal crank arm 217 which, as shown in FIG. 27, has one end 217a movably received in an elongate slot (not shown) formed in the head plate 105 and the other end 217b connected to the other end of the spring 206, the crank arm 217 being pivotally mounted at its cranked corner 217c on a pin 218 fixedly connected to the chassis. This arrangement is intended to utilize a maximum of tensile force of the spring 206 for application convertibly through the medium of the crank arm 217 to the head plate 105 so that the cartridge is effectively urged into pressure contact with the head and pinch rollers as required.

Designated at 223 is a shock-absorbing member adapted for abutting engagement with the elevating frame 143 when the latter is flipped upward.

Designated at 224 is a spring-biased rotatable flapper extending downwardly into the path of the cartridge A.

Figure 29:
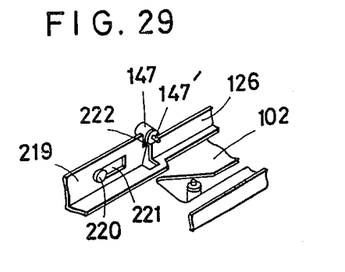
FIG. 29 is a perspective view of a stopper means operatively associated with the upper slidable frame member.
Figure 30:
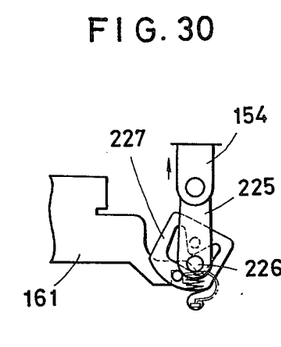
FIGS. 30 to 33 inclusive are schematic plan views showing the operation of a forward and reverse mechanism according to another preferred embodiment.
Figure 31:
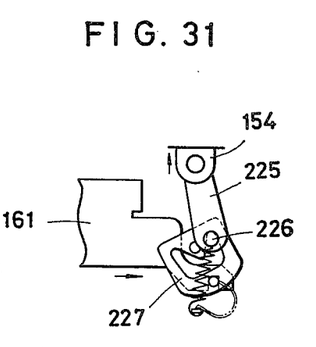
Figure 32:
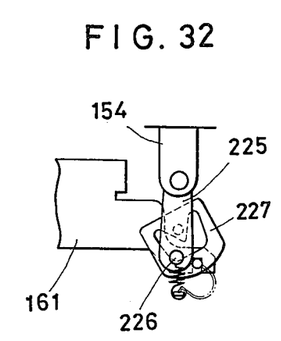
Figure 33:
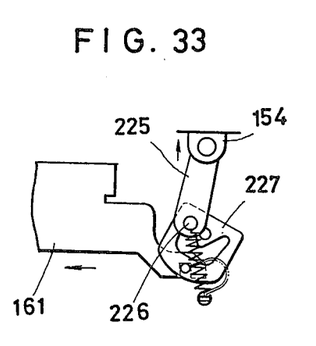

According to another feature of the invention, there is provided a stopper means 219 as shown in FIG. 29 which is slidably connected to the flanged wall 126 of the upper frame member 102 by means of a pin 220 movable in a horizontally elongated slot 221 and which is provided at one end with a stopping ledge 222 disposed for abutting engagement with a projection 147' formed axially of the engaging pin 147 extending from the elevating frame 143 (FIGS. 1 and 7). This arrangement ensures that the cartridge A when inserted is temporarily held in an elevated position by the stopper means 219 with its ledge 222 abutting against and preventing the engaging pin 147 from descending with the elevating frame 143 until the hand of the operator is released from the cartridge.

According to a preferred embodiment of the invention, the forward and reverse mechanism may be constructed with parts shows in FIGS. 30 to 33 which includes a pivotal hook 225 of a tongue shape having connected at one end to the slidable member 154 and having a spring-biased engaging pin 226 at the opposite end a swing plate 227 having a forked aperture shaped to provide four anchoring positions for the pin 226. This arrangement provides forward to reverse, or vice versa, movement of the changing plate 161 substantially similar to the function provided by corresponding parts shown in FIGS. 10 and 11.

What is claimed is:

1. A magnetic tape reproducing apparatus for reproducing a cartridge containing a magnetic tape which comprises in combination:
   a chassis having an upper deck;
   a head plate mounted on the chassis, a magnetic head and pinch rollers mounted on the head plate alongside of the path of cartridge insertion, and a guide pin mounted on the head plate;
   actuating means for actuating the head plate comprising a lower slidable frame member having a guide slot therein for receiving said guide pin of the head plate and having a flanged side wall, a cutaway recess having a sloped edge being formed in said side wall of said lower member and a guide bar connected to the chassis and slidably mounting said lower slidable frame member;
   locking means for locking said lower slidable frame member comprising a spring-biased engaging arm pivotally connected to said lower slidable frame member and having a lateral projection and a downwardly projecting tongue positioned for insertion in a locking slot formed in the upper deck of the chassis; and
   cartridge mounting and dismounting means comprising an upper slidable frame member and an eject spring mounted together on said guide bar, said upper slidable frame member having a flanged side wall, a recessed elongated slot being formed in said side wall of said upper member, a cartridge receiving and releasing arm extending from said upper slidable frame member, a prong extending from one end of said upper slidable frame member for contact with said lateral projection of said engaging arm, a casing for receiving therein the cartridge, said casing having an integral arm, said integral arm mounting an engaging pin which is movable with sliding movement of the frame members, said engaging pin being received both in said recessed elongated slot formed in said flanged side wall of the upper slidable frame member and in said cutaway recess formed in said flanged side wall of the lower slidable frame member for engagement with the sloped edge of said recess, and an elevating frame pivotally connected to the chassis and fixed to said casing for raising and lowering said casing.

2. The apparatus as defined in claim 1 which further includes an engaging pin extending from said elevating frame, a projection formed axially of said engaging pin, a stopper means slidably connected to the flanged side wall of said upper frame and having a stopping ledge disposed for abutting contact with said projection, whereby the cartridge is held temporarily in an elevated position when it is fully inserted.

3. The apparatus as defined in claim 1 wherein said tongue is received in said locking slot to complete the insertion of the cartridge and exits therefrom to release the cartridge.

4. The apparatus as defined in claim 1 which further includes means for reversing the tape travel which comprises a pair of idler rollers, means mounting the idler rollers for pivotal movement relative to the chassis, a pair of reel bases, a pair of capstan shafts, a changing plate slidably mounted on the chassis for bringing the idler rollers into and out of engagement with the reel bases and the capstan shafts for imparting rotation of the capstan shafts to the reel bases, a swing plate interlinked with said changing plate and provided with a pair of engaging pins, and an electromagnetic plunger having connected thereto a spring-biased hook, said hook being disposed for engagement with either of said pair of engaging pins upon actuation of said plunger to reverse the direction of travel of the tape.

5. The apparatus as defined in claim 4 wherein said swing plate is substantially triangular in shape and is rotatable in either direction.

6. The apparatus as defined in claim 4 wherein said changing plate is provided with a limiting strip disposed in abutting relation to the engaging arm of the lower slidable frame member.

7. The apparatus as defined in claim 4 which includes a control rod having a sensing strip for releasing the tongue of the arm from the locking slot, and a slidable pushbutton linked to an end of the control rod.

8. The apparatus as defined in claim 7 which includes an operating rod and a fast-forward and reverse lever and wherein said control rod is provided with a pivotal arm connected to said operating rod and said operating rod is connected to said fast-forward and reverse lever.

9. The apparatus as defined in claim 7 which further includes means for effecting pressure engagement of the cartridge with the magnetic head and the pinch rollers, which means comprises a crank arm, a head plate actuating spring, one end of said crank arm being pivotally connected to the head plate and the other end connected to said head plate actuating spring, said crank arm also having a cranked corner, a pin fixedly connected to the chassis for pivotally mounting said crank arm at said cranked corner, said crank arm being pivotally mounted at its cranked corner on said mounting pin.

* * * * *